US011954922B2

(12) United States Patent
Rundo et al.

(10) Patent No.: US 11,954,922 B2
(45) Date of Patent: Apr. 9, 2024

(54) METHOD OF PROCESSING SIGNALS INDICATIVE OF A LEVEL OF ATTENTION OF A HUMAN INDIVIDUAL, CORRESPONDING SYSTEM, VEHICLE AND COMPUTER PROGRAM PRODUCT

(71) Applicant: STMicroelectronics S.r.l., Agrate Brianza (IT)

(72) Inventors: Francesco Rundo, Gravina di Catania (IT); Giancarlo Asnaghi, Milan (IT); Sabrina Conoci, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 85 days.

(21) Appl. No.: 17/715,744

(22) Filed: Apr. 7, 2022

(65) Prior Publication Data

US 2022/0327845 A1   Oct. 13, 2022

(30) Foreign Application Priority Data

Apr. 9, 2021   (IT) .......... 102021000008915

(51) Int. Cl.
| | |
|---|---|
| *G06V 20/59* | (2022.01) |
| *G06V 10/77* | (2022.01) |
| *G06V 10/82* | (2022.01) |
| *G06V 40/16* | (2022.01) |

(52) U.S. Cl.
CPC ........ *G06V 20/597* (2022.01); *G06V 10/7715* (2022.01); *G06V 10/82* (2022.01); *G06V 40/168* (2022.01)

(58) Field of Classification Search
CPC .. G06V 20/597; G06V 10/7715; G06V 10/82; G06V 40/168
See application file for complete search history.

(56) References Cited

U.S. PATENT DOCUMENTS

| | | | |
|---|---|---|---|
| 2019/0117096 A1* | 4/2019 | Rundo | A61B 5/02405 |
| 2019/0159735 A1* | 5/2019 | Rundo | A61B 5/725 |
| 2020/0057487 A1* | 2/2020 | Sicconi | G06T 7/254 |
| 2020/0214614 A1 | 7/2020 | Rundo et al. | |
| 2020/0330020 A1* | 10/2020 | Rundo | B60W 40/08 |
| 2021/0068739 A1* | 3/2021 | Rundo | A61B 5/7246 |

(Continued)

OTHER PUBLICATIONS

IT Search Report and Written Opinion for priority application, IT Appl. No. 102021000008915, report dated Dec. 2, 2021, 8 pgs.

(Continued)

*Primary Examiner* — Md K Talukder
(74) *Attorney, Agent, or Firm* — Crowe & Dunlevy LLC

(57) ABSTRACT

A time series of face images of a human during a human activity are captured. A first artificial neural network (ANN) processing pipeline processes the captured time series of face images to provide a first attention level indicator signal. An electrophysiological signal indicative of the level of attention of the human during the activity is also captured. A second ANN processing pipeline processes the sensed electrophysiological signal to providing a second attention level indicator signal. A risk indicator signal is then generated based on at least one of the first attention level indicator and second attention level indicator. A user circuit is then triggered as a result of the risk indicator reaching or failing to reach at least one attention level threshold.

9 Claims, 3 Drawing Sheets

(56) References Cited

U.S. PATENT DOCUMENTS

2021/0221396 A1* 7/2021 Awano .................... B60R 21/00
2022/0327845 A1* 10/2022 Rundo ................... G06V 10/82

OTHER PUBLICATIONS

"Driver Drowsiness Detection based on Multimodal using Fusion of Visual-feature and Bio-signal", 2018 International Conference on Information and Communication Technology Convergence (ICTC), IEEE, Oct. 17, 2018 (Oct. 17, 2018), pp. 1249-1251, XP033447928.

"Real-time physiological and vision monitoring of vehicle driver for non-intrusive drowsiness detection", IET Communications, The Institution of Engineering and Technology, GB, vol. 5, No. 17, Nov. 25, 2011 (Nov. 25, 2011), pp. 2461-2469, XP006039467.

Awais, et al., "Automated eye blink detection and tracking using template matching," 2013 IEEE Student Conference on Research and Development, Putrajaya, Malaysia, 2013, pp. 79-83, doi: 10.1109/SCOReD.2013.7002546.

Haq, et al., "Eye-blink rate detection for fatigue determination," 2016 1st India International Conference on Information Processing (IICIP), Delhi, India, 2016, pp. 1-5, doi: 10.1109/IICIP.2016.7975348.

Kurylyak, et al., "Detection of the eye blinks for human's fatigue monitoring," 2012 IEEE International Symposium on Medical Measurements and Applications Proceedings, Budapest, Hungary, 2012, pp. 1-4, doi: 10.1109/MeMeA.2012.6226666.

Nacer, et al., "Vigilance detection by analyzing eyes blinking," 2014 World Symposium on Computer Applications & Research (WSCAR), Sousse, Tunisia, 2014, pp. 1-5, doi: 10.1109/WSCAR.2014.6916844.

Sanyal, et al., "Two Stream Deep Convolutional Neural Network for Eye State Recognition and Blink Detection," 2019 3rd International Conference on Electronics, Materials Engineering & Nano-Technology (IEMENTech), Kolkata, India, 2019, pp. 1-8, doi: 10.1109/IEMENTech48150.2019.8981102.

Veena, "Efficient Method of Driver Alertness Using Hybrid Approach of Eye Movements and Bio-signals," 2014 International Conference on Intelligent Computing Applications, Coimbatore, India, 2014, pp. 78-80, doi: 10.1109/ICICA.2014.25.

* cited by examiner

METHOD OF PROCESSING SIGNALS INDICATIVE OF A LEVEL OF ATTENTION OF A HUMAN INDIVIDUAL, CORRESPONDING SYSTEM, VEHICLE AND COMPUTER PROGRAM PRODUCT

PRIORITY CLAIM

This application claims the priority benefit of Italian Application for Patent No. 102021000008915, filed on Apr. 9, 2021, the content of which is hereby incorporated by reference in its entirety to the maximum extent allowable by law.

TECHNICAL FIELD

The description relates to methods and systems for detecting a state of a driver of a vehicle.

One or more embodiments may be used to possibly generating alert signals and/or activating safety procedures (e.g., taking over control of the vehicle) based on the detected state, for instance within the framework of an advanced driver-assistance system (ADAS) or a driver alcohol detection system for safety (DADSS).

BACKGROUND

A reduced level of attention (e.g., drowsiness) of a driver (before and during driving) of a vehicle may adversely affect driving safety. Driver drowsiness may lead to road traffic accidents involving vehicles. The possibility to detect an attention state of a driver may facilitate evaluation of his/her fitness to drive a vehicle, facilitating prevention of road accidents.

Existing systems for driver attention monitoring are based on recorded images of a driver, in particular a driver's face, during driving.

These "face analysis" solutions based on image-data may suffer from drawbacks such as, for instance: visual noises, for instance glasses worn on the driver's face, which may hinder data processing, or high complexity and difficulty in calibrating and adapting the system for different car drivers.

Alternatively, existing systems may rely on electrophysiological signal processing.

It is known that a correlation exists between attention levels and heart rate variability (HRV), so that estimating HRV of a human can be indicative of drowsiness.

HRV is the physiological signal of variation of time intervals between heartbeats. Thus, HRV is indicative of autonomous nervous system activity state, which is responsible of operating automatic, unconscious and involuntary body activities, such as heartbeat activity.

An HRV value may be obtained via processing of measured electrophysiological signals related to heartbeats, e.g., ElectroCardioGraphy (ECG) and/or PhotoPletysmoGraphy (PPG) signals.

These "physiological analysis" solutions based on electrophysiological signals may suffer from drawbacks such as, for instance: complexity in embedding electrophysiological sensing devices in the vehicle; for instance, installing ECG detectors on the car steering wheel of a vehicle would involve that (both) the driver's hands should be steadily placed on the car steering wheel at those positions where the ECG detectors are located; lengthy data buffering, for instance approximately 8 to 10 minutes of detected ECG time series would be used to provide a robust measure of driver drowsiness, leading to low-dynamic (e.g., slow) change-of-status/alert signaling; and complex frequency-domain signal processing involved in HRV computation, since HRV is linked to the frequency of detected ECG/PPG signals, would imply costly/slow CPU intensive computation.

An extensive activity is carried on and several approaches are proposed in literature, as discussed in the following documents (each of which is incorporated herein by reference):

Haq, et al., "Eye-blink rate detection for fatigue determination," 2016 1st India International Conference on Information Processing (IICIP), Delhi, India, 2016, pp. 1-5, doi: 10.1109/IICIP.2016.7975348, which discussing detection of eye, calculating the eye-blink rate of a person and then determining his level of attentiveness;

Awais, et al., "Automated eye blink detection and tracking using template matching," 2013 IEEE Student Conference on Research and Development, Putrajaya, Malaysia, 2013, pp. 79-83, doi: 10.1109/SCOReD.2013.7002546, which discusses a method for eye blink detection using template matching and similarity measure, where face detection is applied before extraction of the eye template, golden ratio concept is introduced for robust eye detection and is followed by eye template creation for tracking and eye tracking is performed by template matching between template image and surrounding region; the normalized correlation coefficient is computed for successful eye tracking;

Sanyal, et al., "Two Stream Deep Convolutional Neural Network for Eye State Recognition and Blink Detection," 2019 3rd International Conference on Electronics, Materials Engineering & Nano-Technology (IEMENTech), Kolkata, India, 2019, pp. 1-8, doi: 10.1109/IEMENTech48150.2019.8981102, which discusses an automated eye state classification and blink detection algorithm involving detection of eye blinks from a video stream by classifying the eye state of every frame as open or closed, where the eyes are first localized from a frame with robust state-of-the-art facial landmark detectors, then binary masks of the eyes are computed to capture and focus on how much the eyes are open, and where a two stream convolutional neural network model which is jointly trained with the extracted eye patches, their masks as inputs and the corresponding eye state as output;

Kurylyak, et al., "Detection of the eye blinks for human's fatigue monitoring," 2012 IEEE International Symposium on Medical Measurements and Applications Proceedings, Budapest, Hungary, 2012, pp. 1-4, doi: 10.1109/MeMeA.2012.6226666, which discusses a non-intrusive vision based system for eye blinks detection and fatigue level monitoring which uses a web camera positioned in front of the face and a cascade of boosted classifiers based on Haar-like features for fast detection of the eyes region, where the frames differencing in combination with the thresholding are applied to detect the eyes closure and opening;

Nacer, et al., "Vigilance detection by analyzing eyes blinking," 2014 World Symposium on Computer Applications & Research (WSCAR), Sousse, Tunisia, 2014, pp. 1-5, doi: 10.1109/WSCAR.2014.6916844, which discusses detecting and preventing reduced vigilance driving to improve road safety; and Veena, "Efficient Method of Driver Alertness Using Hybrid Approach of Eye Movements and Bio-signals," 2014 International Conference on Intelligent Computing Applications, Coimbatore, India, 2014, pp. 78-80, doi: 10.1109/ICICA.2014.25, which discusses a reliable driver drowsiness detection system which could alert the driver before a mishappening occurs where the drowsiness can be detected by various features like eye blinking rate, head movement, vehicle speed, movement of accelerators, and calculating the pulse rate, and where the sensors are placed on the steering wheel to avoid the uncomfortableness to the driver. The document further discusses a hybrid drowsiness detection system that combines non-intrusive physiological measures with other measures to accurately determine the drowsiness level of a driver.

As mentioned, various solutions proposed in the literature may be exposed to one or more of the following drawbacks: reduced performance when adapted to different people in the driver's place; use of CPU-intensive and time-consuming methods; challenging in embedding these solutions in a vehicle space, for instance due to a difficulty in providing complex hardware architectures onboard a car; reduced performance in low-light conditions, or with visual noises (e.g., glasses worn by driver); and high latency in providing an output, which is hardly compatible with fast reactions of a safety system.

Existing solutions hence suffer from low-speed detection of a change in the state of an attention level of, e.g., a driver of a vehicle, especially while employing relatively cheap and low complexity components.

There is a need in the art to contribute in overcoming the aforementioned drawbacks.

SUMMARY

One or more embodiments may relate to a method.

One or more embodiments may relate to a corresponding (processing) system.

An advanced driver assistance system configured to perform the signal processing method as per the present disclosure may be exemplary of such a system.

One or more embodiments may relate to a vehicle equipped with the system according to embodiments.

One or more embodiments combine image processing and electrophysiological signal processing using innovative deep learning and data processing techniques, in a synergistic way. For instance, this facilitates overcoming individual drawbacks of separate processing pipelines, providing a more robust and efficient overall system.

One or more embodiments may facilitate continuous driver drowsiness detection/monitoring without the employ of frequency domain computations as well as without lengthy data-buffering.

One or more embodiments may comprise an ad-hoc (hyper)-filtering pipeline facilitating to extract, e.g., concurrently, various PPG signal features/dynamics.

One or more embodiments may facilitate providing one or more of the following advantages: increased speed; reduced costs and computational complexity; dispensing from fully labelling every object of a training set; dispensing from use of complex systems; streamlining of multiple processing pipelines; innovative domain-adaptation thanks to a self-attention deep neural network; easy adaptability to different car driving scenarios; adaptability to low-light scenario; and robustness against possible temporary unavailability of signals of one of the two pipelines, e.g., due to a misaligned position of the driver with respect to electrophysiological signal sensors.

BRIEF DESCRIPTION OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale.

The references used herein are provided merely for convenience and hence do not define the extent of protection or the scope of the embodiments.

Throughout the figures annexed herein, like parts or elements are indicated with like references/numerals; for brevity a corresponding description will not be repeated for each and every figure.

Also, throughout this description, the wording "neural network (processing)" as used, for instance, in expressions like artificial neural network (ANN) processing or convolutional neural network (CNN) processing, is intended to designate machine-implemented processing of signals performed via hardware (HW) and/or software (SW) tools.

Figure 1:
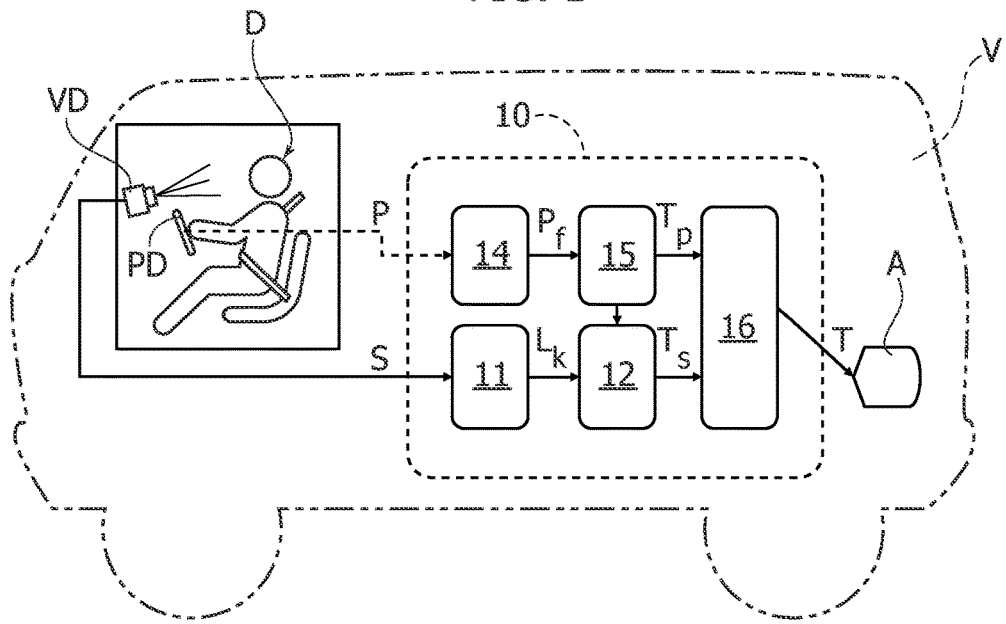
FIG. 1 is a diagram exemplary of processing pipelines as per the present disclosure.

By way of general reference, FIG. 1 is exemplary of a vehicle V comprising a system for detecting a level of attention of a driver D during driving of the vehicle V, e.g., detecting a state between wakeful or drowsy state.

As exemplified in FIG. 1, the system comprises signal acquisition circuitry VD, PD configured to detect at least one driver signal S, P during driving of the vehicle V. The driver signals S, P comprise electrically transduced physiological and/or biometric signals indicative of a level of attention of the driver D. As discussed herein, the term "physiological signals" refer to measurable quantities related to physiological phenomena of the body, and "biometric signals" refers to measurable characteristics suitable to be used to describe individuals (which can include also physiological signals).

The signal processing circuitry 10 is coupled to the signal acquisition stage VD, PD and configured to receive the at least one of the driver signals S, P therefrom. The signal processing circuitry 10 is configured to apply artificial neural network (ANN) processing to the at least one driver signal S, P, providing an indicator signal T to user circuits A as a result of the ANN processing.

In one or more embodiments, the user circuits A may comprise an advanced driver assistance system (ADAS), configured to receive the indicator T and to use it in assisting with car driving operations, for instance providing an alert to the driver D of the vehicle V as a result of the indicator T being below or above a certain threshold and/or taking control over the vehicle V in case a drowsy driver state is detected, potentially improving driving safety.

For instance, the results produced by the system can be presented on a display unit A to an operator, e.g., a medical practitioner, with the capability of supporting his activity, e.g., for diagnostic purposes.

As exemplified in FIG. 1, the signal acquisition circuitry VD, PD comprises a first sensor VD and a second sensor PD. The first sensor VD, such as a smartphone camera or a low frame rate camera (e.g., 25 frames per second), is configured to record (video) images S of a body-portion of a driver D during driving the vehicle V, e.g., the camera VD may be directed towards the face of the driver D so as to record the face expressions or other biometrics of the driver D. The second sensor PD, such as an electrophysiological sensor PD, is configured to detect an electrophysiological signal P of the driver D. A conventional electrocardiogram (ECG) probe circuitry conventional type or photoplethysmography (PPG) probe circuitry, e.g., known from document United States Patent Application Publication No. 2020/330020 A1 (incorporated by reference) may be suitable for use in one or more embodiments.

In one or more embodiments, a PPG signal P may be simpler to process according to a method as disclosed herein, as it may be easier to sample in an automotive environment with respect to an ECG signal, due to a reduced invasiveness of the hardware in the limited volume of the vehicle V. For instance, PPG probe circuitry PD may be embedded in the steering wheel of the vehicle V.

Thus, for the sake of simplicity, embodiments are discussed in the following mainly in relation to the processing of a PPG signal as electrophysiological signal P, being otherwise understood that such an electrophysiological signal type is purely exemplary and in no way limiting.

As exemplified in FIG. 1, the signal processing circuitry 10 comprises a first ANN processing pipeline 11, 12 and a second ANN processing pipeline 14, 15. The first ANN processing pipeline 11, 12 is coupled to the first sensor VD to receive a first driver signal S therefrom. The first ANN processing pipeline 11, 12 is configured to apply ANN processing to the first driver signal S, as discussed in the following, providing a first indicator signal $T_s$ as a result of the ANN processing. The second ANN processing pipeline 14, 15 is coupled to the second sensor PD and configured to receive a second driver signal S therefrom. The second processing pipeline 14, 15 is configured to apply a second ANN processing to the second driver signal S, as discussed in the following, providing a second indicator $T_p$ as a result of the ANN processing.

The signal processing circuitry 10 further comprises a classifier stage 16 coupled to the first 11, 12 processing pipeline and to the second 14, 15 processing pipeline to receive the first $T_s$ indicator signal and/or second $T_p$ indicator signal therefrom. The classifier stage 16 is configured to classify an attention level of the driver D based on the first $T_s$ indicator signal and second $T_p$ indicator signal received (e.g., based on a weighted combination of the first $T_s$ indicator signal and second $T_p$ indicator signal), producing a global indicator signal T indicative of the attention level of the driver D, e.g. a driver drowsiness risk indicator.

For instance, the indicator signal T may be expressed as:

$$T=k_1\varphi(T_s)+k_2\psi(T_p)$$

where $k_1$ and $k_2$ are scaling weights and $\varphi$, $\psi$ are weight functions.

For instance, the system may trigger an alert message/signal to user circuits A based on the indicator signal T reaching or failing to reach one or more attention level thresholds $T_1$, $T_2$.

For instance, the risk signal may be a message displayed on a screen A onboard the vehicle V, the message being indicative of a confidence interval or probability of the detected drowsiness state:

"Low risk" if indicator signal $T \leq T_1 = 0.49$
"Medium risk" if indicator signal $T_1 < T \leq T_2 = 0.6$
"High risk" if indicator signal $T > T_2$.

For the sake of simplicity, the case above exemplifies static threshold values. It is noted that this is just one of the possible ways to set threshold values, as in one or more embodiments one or more threshold values $T_1$, $T_2$ may be adjusted "online" or may be set with adaptively.

As exemplified in FIG. 1, the first processing pipeline 11, 12 comprises an image pre-processing stage 11 and a first ANN processing stage 12. The image pre-processing stage 11 is configured to extract images captured in the received first signal S from the camera VD and identify (e.g., luminance) signals at a set of (face) landmark points $L_k$, e.g., fiducial face landmark points around face components and face contour which facilitate to capture the rigid and non-rigid face deformations due to head movements and face expressions, which can be found for instance around nose, mouth and eyes of the human individual (or person) D. The first ANN processing stage 12 configured to receive the set of pre-processed signals $L_k$ identified at said first set of landmark points and to apply first ANN processing thereto, providing the first indicator signal $T_s$ as a result.

Object detection processing as discussed in the reference Viola, et al., "Rapid object detection using a boosted cascade of simple features," Proceedings of the 2001 IEEE Computer Society Conference on Computer Vision and Pattern Recognition. CVPR 2001, Kauai, HI, USA, 2001, pp. I-I, doi: 10.1109/CVPR.2001.990517 (incorporated by reference), is suitable for use in the first-processing stage 11 to identify the landmark points O. This envisages a machine learning approach for visual object detection comprising: an image representation called the "integral image" which allows the features used by the detector to be computed very quickly; a learning algorithm, based on AdaBoost, which selects a small number of critical visual features from a larger set; a method for combining increasingly more complex classifiers in a "cascade". The cascade can be viewed as an object specific focus-of-attention mechanism which unlike previous approaches provides statistical guarantees that discarded regions are unlikely to contain the object of interest. This method may be adapted to be run on a central processing core also in the absence of dedicated graphical processing core, thanks to a reduced number of landmark points being selected.

Such an object detection processing facilitates to reveal variations over time of luminance at the selected set of landmark points, where these variations are indicative of heart pulsatile activity occurring with a variable heart rate, these variations are indicative of an attention level of the driver D of the vehicle V.

For instance, the pre-processed signals $L_k$ can comprise time-series of luminance/intensity data for a respective face landmark point, for instance to obtain a sequence of values of intensity variations frame-by-frame, e.g., relative variation of intensity in an image frame with respect to the preceding image frame.

As exemplified in FIG. 2, the first ANN processing stage 12 comprises: an input layer 120 configured to receive the set of landmarks $L_k$; a long short-term memory (LSTM) deep neural network (e.g., having 50 neural cells) 122 coupled to the input layer and configure to apply LSTM processing thereto, as discussed in the following; a convolutional neural network (CNN) 124 coupled to the LSTM network 122 and configure to apply CNN processing thereto, as discussed in the following; an encoder layer 125 coupled to the CNN network 124 and configured to apply encoder processing to provide a set of features F extracted from data received therefrom; optionally, an enhancer layer 127 coupled to the encoder layer 122, the enhancer layer 127 configured to receive the set of features F therefrom and to apply enhancement processing thereto as discussed in the following, providing a set of enhanced features F' as a result of enhancement processing; a decoder layer 128 coupled to the decoder layer 128, optionally via the enhancer layer 127, the decoder layer 128 configured to receive the set of (enhanced) features F, F' therefrom and apply decoder processing thereto; and an output, classification layer 129, e.g., a softmax layer, configured to provide the first indicator signal $T_s$.

As appreciable to those of skill in the art, the encoder-decoder layers may form together a stacked autoencoder (SAE) neural network.

As known to those of skill in the art, a long short-term memory (LSTM) neural network is an artificial recurrent neural network (RNN) architecture having feedback connections among cells therein.

Figure 3:
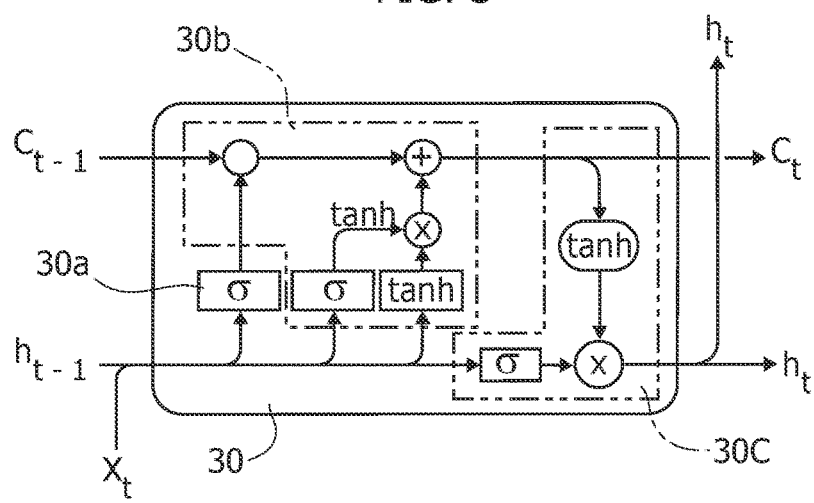
FIGS. 3, 3A, 4 and 5 are diagrams exemplary of respective portions of FIG. 2.

As exemplified in FIG. 3, the LSTM unit 122 comprises of a cell 30, a forget gate 30a, an input gate 30b and an output gate 30c. The cell 30 is configured to "remember" values over arbitrary time intervals. The gates 30a, 30b, 30c are configured to regulate the flow of information into and out of the cell 30. LSTM networks can be suited to classifying, processing and making predictions based on time series data. The LSTM network 122 of the first ANN stage 12 may facilitate obtaining a model in which the network learns what information to store in long term memory and what information to get rid of, hence providing a model which learns patterns in data which may be separate in time, as the time-series of landmarks $L_k$.

For the i-th LSTM cell 30 as exemplified in FIG. 3, various parameters involved in the computation may be expressed as:

$f_t = \sigma(W_f \cdot [h_{t-1}, x_t] + b_f)$ $i_t = \sigma(W_i \cdot [h_{t-1}, x_t] + b_i)$ $\tilde{C}_t = \tanh(W_c \cdot [h_{t-1}, x_t] + b_c)$ $C_t = f_t * C_{t-1} + i_t * \tilde{C}_t$ $o_t = \sigma(W_o \cdot [h_{t-1}, x_t] + b_o)$ $h_t = o_t * \tanh(C_t)$ where: $W_f$ is a respective set of weights of the first gate 30a of the LSTM cell 30; $b_f$ is a respective set of bias values of the first gate 30a of the LSTM cell 30; $W_i$ is a respective first sub-set of weights of the second gate 30b of the LSTM cell 30; $b_i$ is a respective first sub-set of bias values of the second gate 30b of the LSTM cell 30; $W_C$ is a respective second sub-set of weights of the second gate 30b of the LSTM cell 30; $b_C$ is a respective second sub-set of bias values of the second gate 30b of the LSTM cell 30; $W_O$ is a respective third sub-set of weights of the third gate 30c of the LSTM cell 30; $b_O$ is a respective third sub-set of bias values of the third gate 30c of the LSTM cell 30; $X_{t-1}$ is a first input; $h_{t-1}$ is a first output; $C_{t-1}$ is a first cell state; $X_t$ is a second input; $h_t$ is a second output; and $C_t$ is a second cell state.

As known to those of skill in the art, CNN processing 124 is a kind of deep neural network (DNN) processing suitable to be applied to analyzing images. The name "convolutional neural network" indicates that the network employs convolution operations, in place of general matrix multiplication in at least one of their layers.

Figure 3A:
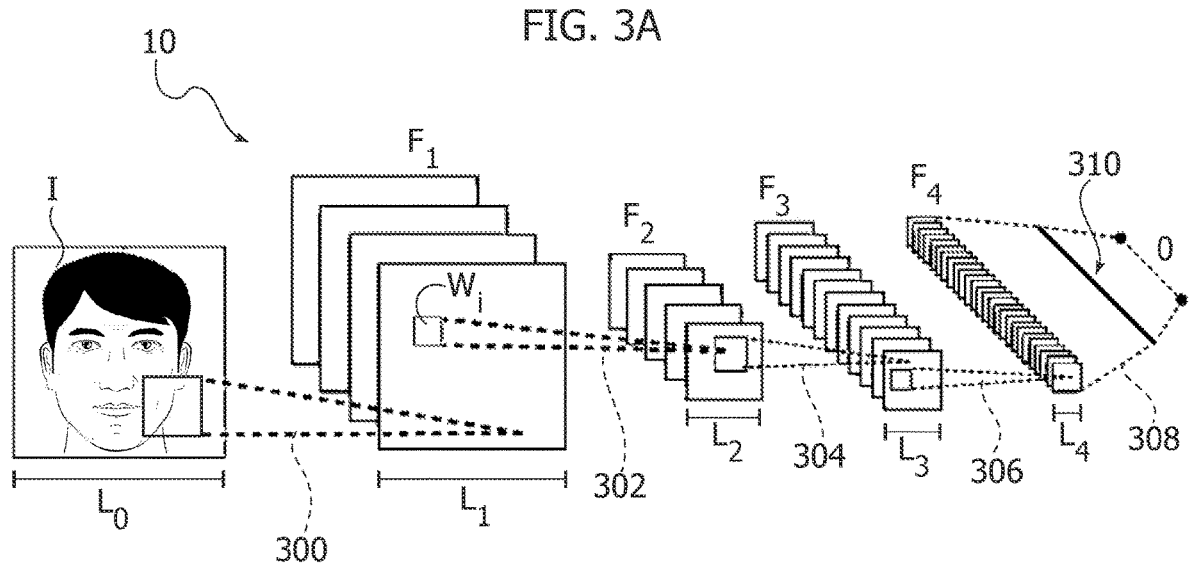

As exemplified in FIG. 3A, in addition to an input layer 300 configured to receive an input image tensor I with a certain size, for instance an image tensor I having a size given by the image width $L_0$ times an image height (e.g., equal to the image width $L_0$) times an image depth (e.g., 1) times a number of images in the tensor I (e.g., 1), the CNN processing stage 124 may comprise: a plurality of (hidden) processing layers 302, 304, 306, 308 coupled to the input layer 300 and configured to apply to an image tensor received therefrom, data processing such as convolutional and/or pooling processing, for instance; and an output layer 310 coupled to the input layer 300 via the hidden layers 302, 304, 306, 308, the output layer 310 comprising a fully connected layer, for instance.

As illustrated, the processing layers 300, 302, 304, 306, 308, may be configured to produce respective feature maps $F_1, F_2, F_3, F_4$. Each such feature map may have a size given by a feature map width $L_1, L_2, L_3, L_4$ times a feature map height (which may be equal to the width $L_1, L_2, L_3, L_4$) times feature map channels (e.g., three channels for a RGB image having red, green and blue colors), times a number of maps.

In one or more embodiments, the processing layers 302, 304, 306, 308 may have a multi-layer perceptron (MLP) architecture, comprising a plurality of processing units indicated as perceptrons.

A single i-th perceptron in the plurality of perceptrons may be identified by a tuple of values comprising weight values $w_i$, offset values $b_i$ and an activation function $\rho_i$.

As exemplified in FIG. 3A, a convolutional processing layer, such as the one referenced as 302 (taken as an example of the various layers), comprises at least one convolution kernel (matrix) $w_i$ having a size which may be expressed as:

$w_i \in R^{C \times H \times T} i = 1, \ldots K$ where: H represents kernel height; T represents kernel width; K represents number of kernels, e.g., K=1; and C represents a number of input channels, which may be equal to a number of (image color) channels of the input feature map $F_1$.

The output layer 310 may comprise a fully connected layer, that is a type of convolutional layer having connections to all activations in the previous layer.

A convolutional layer such as 302 (again taken as a possible example) may be configured to apply an activation function to a sliding dot product.

Such an operation may be expressed as, for instance:

$$b = \rho(w_i^T \cdot a)$$

where: $w_i^T$ is a transposed version of the weight vector $w_i$ (corresponding to the kernel); a is the input feature vector, e.g., computed by the processing layer 100 preceding the considered one 102; ρ is the activation function of the layer 102; and b is the output resulting from applying the activation function ρ to the product of the kernel and the input feature vector.

Figure 2:
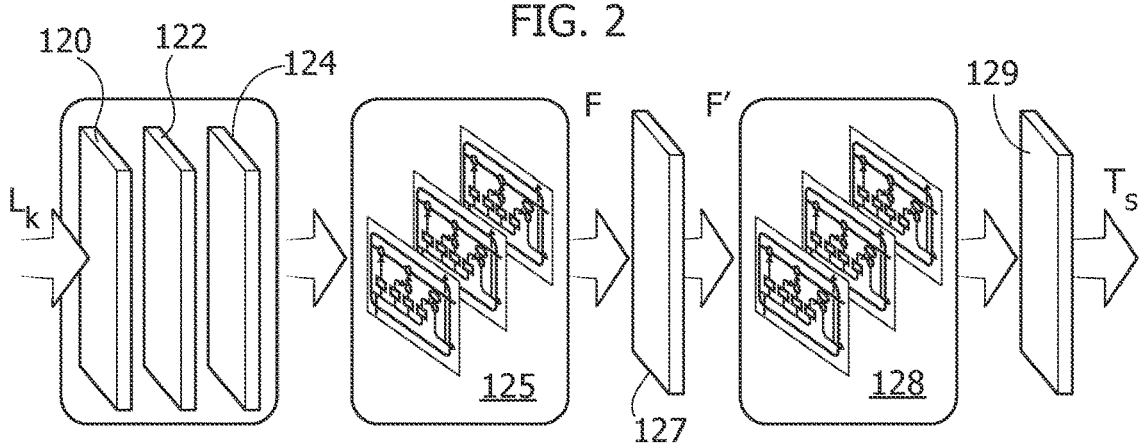
FIG. 2 is a diagram exemplary of a first portion of FIG. 1.

The CNN processing 124 as exemplified in FIGS. 2 and 3A may comprise pooling layers (e.g., configured to perform "max" pooling) with rectified linear unit (ReLu) activation functions, to provide size adaptation between the output of the LSTM 122 and the input of the encoder layer 125.

Figure 4:
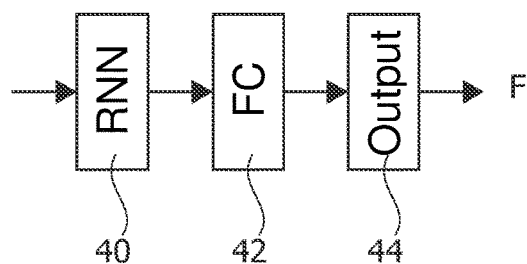

FIG. 4 is a diagram exemplary of the encoder (processing) layer 125.

As exemplified in FIG. 4, the encoder layer 125 is configured to extract a set of features F from input data. The encoder layer 125 comprises a residual neural network (RNN) processing stage 40 coupled to the CNN stage 124 to receive input data therefrom. The RNN processing stage 40 is configured to provide a first set of latent features. A fully connected (FC) layer 42, for instance comprising a hundred neural cells, is coupled to the RNN stage 40. An output layer 44, for instance having a ReLu activation function, is coupled to the fully connected layer 42 and is configured to provide a set of features F.

In one or more embodiments, a known neural network processing configuration currently denominated "ResNet50" may be suitable for use in the RNN processing stage 40. This is a fifty-layers-deep neural network which can be loaded (pre)trained on more than a million images from a databased currently denominated "ImageNet". The pre-trained network can classify images into 1000 object categories.

Figure 5:
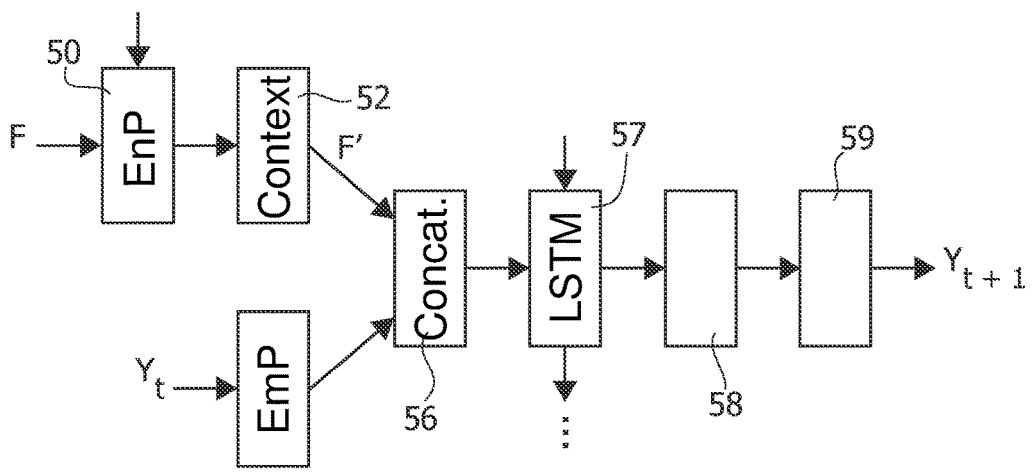

FIG. 5 is a diagram exemplary of a processing method which may be implemented in the enhancement 127 and decoder 128 layers.

As exemplified in FIG. 5, the method comprises receiving the set of features F and applying enhancement processing (EnP) 50 thereto, the enhancement processing comprising calculating 52 a context vector F' having elements Ci which may be expressed as:

$$C_i = \sum_{j=1}^{Tx} \alpha_{ij} h_j$$

where $a_{ij}$ is an attention score which may be expressed as:

$$\alpha_{ij} = \exp(e_{ij}) / \sum_{k=1}^{Tx} \exp(e_{ik})$$

and where $e_{ij}$ is an alignment score which may be expressed as $$e_{ij} = a(s_{i-1}, h_j)$$

In one or more embodiments, enhancement processing 127 may be based on the observation that to improve a "learning" of the ANN processing, it can be advantageous to focus an "attention" of the processing power of the ANN more onto some data points rather than other.

In this application context, "attention" refers to a technique for attending to different parts of an input vector to capture long-term dependencies. This may be seen as analogous to a "human" learning process where more important concepts can be highlighted.

Thus, the enhancement processing 127 may use special weights to enhance some of the features in the set of features F, providing the set of enhanced features F' where these are "highlighted", that is weighted differently.

As exemplified in FIG. 5, the decoder processing 128 further includes receiving the signal $Y_t$ from the CNN network 124 and applying embedding processing (EmP) 54 thereto.

A concatenating layer 56 is configured to receive the context vector F' and the embedded signal $Y_t$ and apply concatenating processing thereto, for instance appending one signal to another. A pattern recognition processing 57, for instance a further LSTM neural network processing receives the concatenated signal. One or more fully connected layers 58, 59 are configured to receive the output from the LSTM network 57 and to output enhanced features $Y_{t+1}$ of the set of enhanced features F'.

As exemplified in FIG. 1, the second processing pipeline 14, 15 may comprise a (hyper) filtering stage 14 and a second ANN stage 15. The (hyper) filtering stage 14 is configured to receive the PPG signal P and apply filtering to it, preferably passband filtering via joint concurrent high pass and low pass filtering, to provide a set of filtered PPG signals $P_f$, e.g. filtered PPG signals. For instance, the set of filtered signals $P_f$ may be stored in a properly defined matrix having a number of columns equal to the number of filters $N_\omega$ employed in the filtering stage 12 and a number of rows equal to the number of PPG signals processed $N_{PPG}$. The second ANN stage 15 is configured to receive the set of filtered electrophysiological signals $P_f$ and to apply pattern recognition 50 thereto in order to detect an attention level $T_p$ of the driver D.

In one or more embodiments, a (hyper-filtering) method as discussed in United States Patent Application Publication Nos. 2020/330020 A1 and 2021/068739 A1 (incorporated herein by reference) may be suitable for use in the filtering stage 14 of the second processing pipeline 14, 15, providing the set of filtered signals $P_f$.

Figure 6:
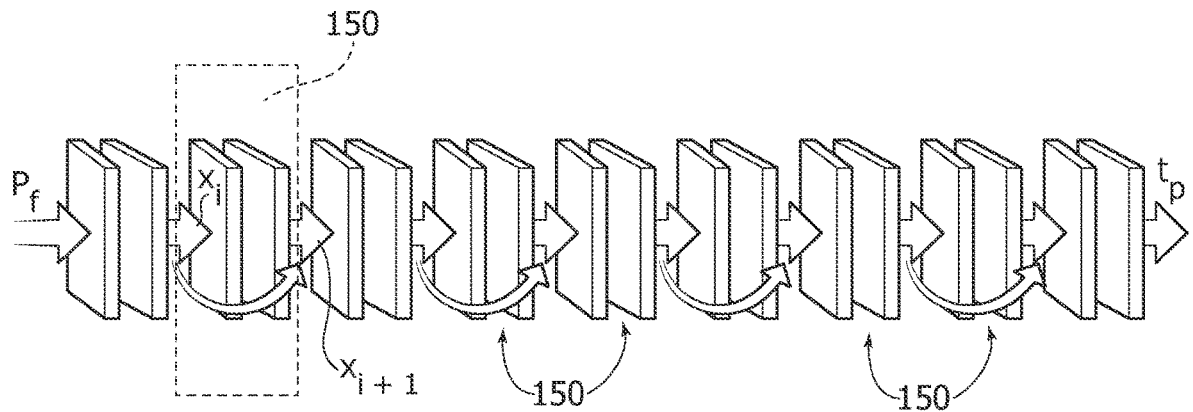
FIG. 6 is a diagram exemplary of a second portion of FIG. 1.

FIG. 6 is a diagram exemplary of the second ANN stage 15, comprising a cascade of ANN processing stages 150 which may be substantially identical one another.

As exemplified in FIG. 6 by an arrow going around an individual block 150, the cascade of ANN stages 150 is (non-mandatorily) arranged so that an output of a given cascade element is added to the output of a subsequent cascade element. This mechanism can be currently referred to as a "dilation" or feed-forward mechanism. Thanks to this mechanism it may be possible, for instance, to improve performance of the cascaded ANN stage 150.

As exemplified in FIG. 6, the "arrow" going around the individual block 150 is exemplary of an optional processing pipeline that may be dedicated to perform processing to the i-th input signal $x_i$ before adding it to the subsequent (i+1)-th output signal $x_{i+1}$. This may be currently referred to as a "residual (processing) block". Such a residual block may apply resizing to the input to facilitate feed-forward application.

For instance, the residual block may comprise a convolutional processing stage with an ad-hoc kernel selected to adjust size of input $x_i$, e.g., making it equal to the size of output $x_{i+1}$.

For instance, the i-th output $x_i$ may be scaled by a scaling factor before being added to the i+1-th output $x_{i+1}$. For instance, such a scaling factor is equal or multiple of two, preferably being increased (e.g., doubled) for each processing stage 150.

It is noted that while nine ANN stages 150 are represented in FIG. 6, such a quantity of cascaded ANN stages is purely exemplary and in no way limiting. Preferably, the cascade comprises sixteen cascaded ANN stages 150.

Figure 7:
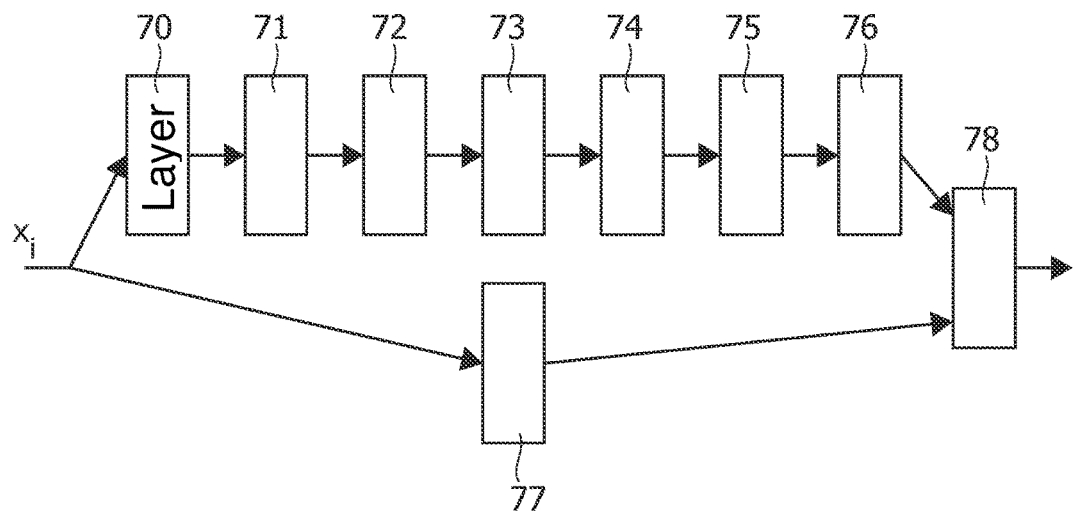
FIG. 7 shows a diagram exemplary of a portion of FIG. 6.

As exemplified in FIG. 7, a single ANN stage 150 in the cascade of ANN stages of the second ANN stage 15 comprises a first layer 70 configured to apply to the i-th input $x_i$ a dilated causal convolution operation thereto.

As discussed herein, a "convolution" is a kind of matrix operation, comprising a kernel (that is a small matrix of weight values) that slides over input data performing element-wise multiplication with the part of the input it is on, then summing the results into an output.

As discussed herein, a "causal convolution" is a kind of convolution used for temporal data where the prediction emitted by the model at timestep does not depend on any of the future timesteps; it can be described also as equivalent to a masked convolution which can be implemented by constructing a mask tensor and doing an element-wise multiplication of this mask with the convolution kernel before applying it.

As discussed herein, a "dilated causal convolution" is a causal convolution where the mask or filter is applied over an area larger than its length by skipping input values with a certain step.

Figure 8A:
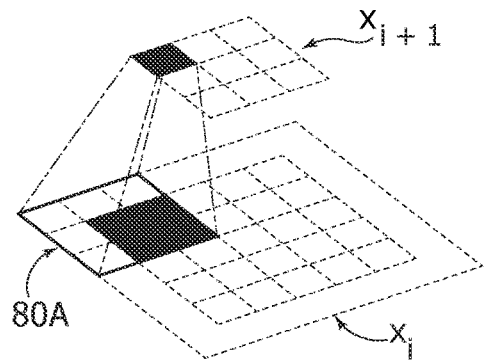
FIGS. 8A and 8B show principles underlying embodiments.
Figure 8B:
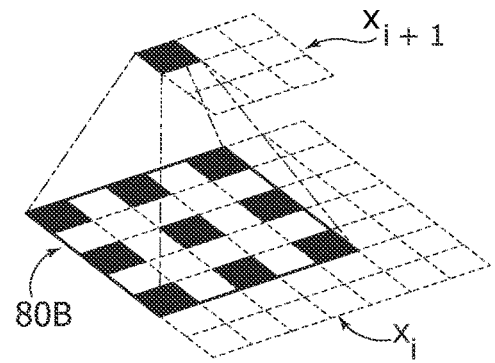

FIG. 8A shows a non-dilated mask 80a applied to an exemplary bidimensional input xi to calculate an exemplary output xi+1 while FIG. 8B shows a dilated mask 80b.

As appreciable by direct visual comparison of FIG. 8B versus FIG. 8A, a dilated mask 80B facilitates computing in case size of the mask and size of the input data do not share a multiple or divisor.

In particular, using the dilated mask 80B it is possible to dispense from using so-called "padding" (indicated with dotted lines in FIG. 8A), which introduces inflation of data, leading to an increased memory footprint.

One or more embodiments may present a kernel size of 3×3 and a batch size of 32, for which dilated causal convolution processing 70 facilitates fast processing.

As exemplified in FIG. 7, the ANN unit 150 further comprises a second layer 71 coupled to the first layer 70 to receive (input) data therefrom and configured to apply a first normalization processing thereto. In one or more embodiments, instance or contrast normalization processing as, e.g., the one discussed in the document Ulyanov, et al., "Instance Normalization: The Missing Ingredient for Fast Stylization." ArXiv abs/1607.08022 (2016), incorporated by reference, may be suitable for the second layer 71, in order to prevent instance-specific mean and covariance shift, simplifying the learning process.

A third layer 72 is coupled to the second layer 71 to receive normalized data therefrom and configured to apply a second normalization processing 72 thereto. In one or more embodiments, (spatial) dropout regularization technique as, e.g., that discussed in Srivastava, et al., "Dropout: A Simple Way to Prevent Neural Networks from Overfitting", Journal of Machine Learning Research 15(56):1929-1958, 2014 (incorporated by reference), may be suitable for use in the third layer 72, where the dropout regularization drops a unit (along with connections) at training time with a specified probability (e.g., probability p=0.5) in order to prevent co-adaptation, where the neural network becomes too reliant on particular connections, as this could lead to overfitting.

A fourth layer 73 is coupled to the third layer 72 to receive normalized data therefrom and configured to apply to the normalized data a further dilated causal convolution operation.

A fifth layer 74 is coupled to the fourth layer 73 to receive dilated data therefrom and configured to apply a third normalization processing thereto, e.g., instance or contrast normalization processing.

A sixth layer 75 is coupled to the fifth layer 70 to receive normalized data therefrom and configured to apply an activation function thereto, e.g., a ReLu function.

A seventh layer 76 is coupled to the sixth layer 75 to receive normalized data therefrom and configured to apply a second normalization processing thereto, e.g., (spatial) dropout regularization technique for neural networks.

An optional adjustment layer 77 is configured to receive the i-th input data $x_i$ and to apply dimensionality reduction thereto, preferably via one-by-one convolution, that is by applying 1×1 convolutional layer to provide feature map pooling or a projection layer, decreasing the number of feature maps while retaining their salient features. This layer 77 facilitates managing the number of feature maps which often increases proportionally to depth of the network.

A superposition layer 78 is configured to receive the normalized data from the last normalization stage 76 and the input data xi from the input or the optional adjustment layer and to superimpose the input xi to the output, providing an enhanced output value $x_{i+1}$.

In one or more embodiments, a final layer of the cascade as exemplified in FIG. 6 may comprise a classification layer (e.g., a softmax layer) configured to provide the second indicator signal $T_p$.

In one or more embodiments, each processing pipeline may be trained to perform ANN processing using respective training datasets and using respective training methods.

For instance, ANNs may be trained, in a manner per se known, using a stochastic gradient descent (SGD) iterative method, where the user initializes the weights and the process updates the weight vector using one data point. The gradient descent continuously updates it incrementally when an error calculation is completed to improve convergence. The method seeks to determine the steepest descent and it reduces the number of iterations and the time taken to search large quantities of data points. Stochastic gradient descent is being used in neural networks and decreases machine computation time while increasing complexity and performance for large-scale problems.

At least one training dataset used to train ANNs as per the present disclosure may comprise images and electrophysiological signals captured during driving of a same person during driving of a same vehicle.

For instance, the training set may comprise captured images in a RGB 640×489 (VGA) format captured with a frame rate of 40 frames per second (fps), as well as PPG signals collected from a sensor PD in the steering wheel of the vehicle. For instance, the training dataset may be split in a first part, e.g., with 70% of the total dataset, used for training and a second part, e.g., with 30% of the total dataset, used for validation e testing.

A method of processing signals indicative of a level of attention of a human individual (for instance, D) during a (human) activity, as exemplified herein, comprises:

capturing a time series of face images (for instance, S) of the human during the activity (for instance, driving a vehicle, preferably a car);

sensing an electrophysiological signal (for instance, P) indicative of said level of attention of the human during the activity; applying a first artificial neural network (ANN) processing pipeline (for instance, 11, 12) to the captured time series of face images, providing a first attention level indicator signal (for instance, $T_s$) as a result;

applying a second ANN processing pipeline (for instance, 14, 15) to the sensed electrophysiological signal (for instance, P), providing a second attention level indicator signal (for instance, $T_p$) as a result;

producing a risk indicator signal (for instance, T) based on at least one of said first and second attention level indicators; and triggering a user circuit (for instance, A) as a result of said risk indicator reaching or failing to reach at least one attention level threshold (for instance, an advanced driver assistance user circuit configured to take control of the vehicle if the attention level threshold of the driver is too low).

As exemplified herein, images of said face of the human in the time series of captured images comprise a set of landmark points of said face of the human (for instance, eyes, nose, ears, etc.).

As exemplified herein, applying said first ANN processing pipeline comprises:

extracting (for instance, 11) a set of time series of landmark signals (for instance, $L_K$) at said set of landmark points from the captured time series of face images;

applying long short-term memory (LSTM) neural network processing (for instance, 122) and convolutional neural network (CNN) processing (for instance, 124) to said extracted set of time-series of landmark signals, producing a set of processed landmark signals as a result;

applying encoder processing (for instance, 125) to said set of processed landmark signals, producing a set of latent features (for instance, F) as a result; and producing the first attention level indicator signal based on said set of latent features.

As exemplified herein, applying said first ANN processing pipeline further comprises: applying enhancement processing (for instance, 127) to said set of latent features, producing a set of enhanced features (for instance, F') as a result; and applying decoder processing (for instance, 128) and classification processing (for instance, 129) to said set of enhanced features, providing the first attention level indicator signal as a result.

As exemplified herein, applying said second ANN processing pipeline comprises:

applying filtering (preferably, hyper-filtering) to said sensed electrophysiological signal, producing a set of filtered signals (for instance, $P_f$) as a result;

applying a cascade of CNN processing stages (for instance, 150) to the set of filtered signals, extracting a set of features therefrom as a result, wherein a first signal (for instance, $x_i$) processed by a CNN processing stage in the cascade of CNN processing stages is scaled and superimposed to a second signal (for instance, $x_{i+1}$) processed by a subsequent CNN stage in the cascade of CNN stages; and applying classification processing to said extracted set of features and providing a second attention level indicator signal (for instance, $T_p$) as a result.

As exemplified herein, at least one CNN processing stage (for instance, 150) in said cascade of CNN processing stages comprises applying a dilated causal convolution (for instance, 70).

A system for processing signals indicative of a level of attention of a human individual (for instance, D) during an activity (for instance, driving a vehicle, preferably a car), as exemplified herein, comprises:

image capturing circuitry (for instance, VD) configured to capture a time series of face images (for instance, S) of the human during said activity;

sensing circuitry (for instance, PD) configured to sense at least one electrophysiological signal (for instance, P) indicative of said level of attention of the human during said activity; and processing circuitry (for instance, 10) coupled to the image capturing circuitry and to the sensing circuitry and configured to receive the captured time series of face images and the sensed electrophysiological signal therefrom, the processing circuitry comprising artificial neural network, ANN, processing circuits (for instance, 11, 12, 14, 15), the processing circuitry being configured to produce a risk indicator signal (T) and trigger said user circuit (A) with the method as exemplified herein.

As exemplified herein, the image capturing circuitry comprises a smart-phone having at least one camera, preferably a low frame-rate camera.

As exemplified herein, the sensing circuitry comprises PPG sensing circuitry configured to sense at least one PPG signal indicative of said level of attention of the human during said activity.

As exemplified herein, a vehicle (for instance, V) is equipped with a system as exemplified herein in combination with at least one driver assistance device (for instance, A), the driver assistance device configured to operate as a function of said risk indicator reaching or failing to reach at least one attention level threshold.

A computer program product as exemplified herein is loadable in the memory of at least one processing circuit and includes software code portions for executing the steps of the method as exemplified herein when the product is run on at least one processing circuit (for instance, 10).

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A method of processing signals indicative of a level of attention as human during an activity, comprising:

capturing a time series of face images of the human during said activity;

applying a first artificial neural network (ANN) processing pipeline to the captured time series of face images to generate a first attention level indicator signal;

sensing an electrophysiological signal indicative of said level of attention of the human during said activity;

applying a second ANN processing pipeline to the sensed electrophysiological signal to generate a second attention level indicator signal, wherein applying the second ANN processing pipeline comprises:

applying filtering to said sensed electrophysiological signals to generate a set of filtered signals;

applying a cascade of CNN processing stages to the set of filtered signals to extract a set of features therefrom by applying a dilated causal convolution for at least one CNN processing stage of the cascade of CNN processing stages, wherein a first signal processed via a CNN processing stage in the cascade of CNN processing stages is scaled and superimposed to a second signal processed via a subsequent CNN processing stage in the cascade of CNN processing stages; and applying classification processing to said extracted set of features to generate said second attention level indicator signal;

producing a risk indicator signal based on a weighted combination of said first and said second attention level indicators; and triggering a user circuit in response to a comparison of said risk indicator to at least one attention level threshold.

2. The method of claim 1, wherein images of said time series of face images comprise a set of landmark points of a face of the human and wherein applying said first ANN processing pipeline comprises:

extracting a set of time series of landmark signals at said set of landmark points from the captured time series of face images;

applying long short-term memory (LSTM) neural network processing and convolutional neural network (CNN) processing to said extracted set of time series of landmark signals to generate a set of processed landmark signals;

applying encoder processing to said set of processed landmark signals to generate a set of latent features; and producing the first attention level indicator signal based on said set of latent features.

3. The method of claim 2, wherein applying said first ANN processing pipeline further comprises:

applying enhancement processing to said set of latent features to generate a set of enhanced features; and applying decoder processing and classification processing to said set of enhanced features to generate the first attention level indicator signal.

4. A system for processing signals indicative of a bevel of attention of a human during an activity, the system comprising:

image capturing circuitry configured to capture a time series of face images of the human during said activity;

sensing circuitry configured to sense at least one electrophysiological signal indicative of said level of attention of the human during said activity;

processing circuitry coupled to the image capturing circuitry to receive the captured time series of face images and to the sensing circuitry to receive the sensed at least one electrophysiological signal, wherein the processing circuitry comprises artificial neural network (ANN) processing circuits and is configured to:

apply a first ANN processing pipeline to the captured time series of face images to generate a first attention level indicator signal;

apply a second ANN processing pipeline to the sensed electrophysiological signal to generate a second attention level indicator signal by:

applying filtering to said sensed electrophysiological signals to generate a set of filtered signals;

applying a cascade of CNN processing stages to the set of filtered signals to extract a set of features therefrom, wherein a first signal processed via a CNN processing stage in the cascade of CNN processing stages is scaled and superimposed to a second signal processed via a subsequent CNN processing stage in the cascade of CNN processing stages, wherein the CNN processing stage of the cascade of CNN processing stages applies a dilated causal convolution; and applying classification processing to said extracted set of features to generate said second attention level indicator signal;

produce a risk indicator signal based on a weighted combination of said first and said second attention level indicators; and trigger a user circuit in response to a comparison of the risk indicator signal to at least one attention level threshold.

5. The system of claim 4, wherein the image capturing circuitry comprises a smart-phone having at least one camera.

6. The system of claim 4, wherein said sensing circuitry comprises PhotoPletysmoGraphy (PPG) sensing circuitry configured to sense at least one PPG signal indicative of said level of attention of the human during said activity.

7. The system of claim 4, wherein images of said time series of face images comprise a set of landmark points of a face of the human and wherein said processing circuitry applies said first ANN processing pipeline to:

extract a set of time series of landmark signals at said set of landmark points from the captured time series of face images;

apply long short-term memory (LSTM) neural network processing and convolutional neural network (CNN) processing to said extracted set of time series of landmark signals to generate a set of processed landmark signals;

apply encoder processing to said set of processed landmark signals to generate a set of latent features; and produce the first attention level indicator signal based on said set of latent features.

8. The system of claim 7, wherein application of encoder processing comprises enhancement processing applied to said set of latent features to generate a set of enhanced features, and wherein producing the first attention level indicator signal comprises applying decoder processing and classification processing to said set of enhanced features to generate the first attention level indicator signal.

9. A vehicle, comprising:

a system according to claim 4; and at least one driver assistance device configured to operate as a function of said risk indicator reaching or failing to reach at least one attention level threshold.

* * * * *